United States Patent
Cannon et al.

[11] Patent Number: 6,038,291
[45] Date of Patent: Mar. 14, 2000

[54] CALL FORWARDING VIA A 2-LINE PHONE

[75] Inventors: Joseph M. Cannon, Harleysville; Paul Joseph Davis, Wayne; James A. Johanson, Emmaus; Scott Wayne McLellan, Albany Township, Berks County, all of Pa.

[73] Assignee: Lucent Technologies Inc., Murray Hill, N.J.

[21] Appl. No.: 09/081,751

[22] Filed: May 20, 1998

Related U.S. Application Data

[60] Provisional application No. 60/064,417, Nov. 6, 1997.

[51] Int. Cl.[7] ...................................................... H04M 1/64
[52] U.S. Cl. .............................. 379/74; 379/211; 379/142
[58] Field of Search ..................................... 379/142, 210, 379/211, 74

[56] References Cited

U.S. PATENT DOCUMENTS

| | | | |
|---|---|---|---|
| 5,416,834 | 5/1995 | Bales et al. | 379/211 |
| 5,448,627 | 9/1995 | Ueno et al. | 379/142 |
| 5,454,029 | 9/1995 | Noda | 379/74 |
| 5,838,779 | 11/1998 | Fuller et al. | 379/211 |
| 5,875,240 | 2/1999 | Silverman | 379/142 |

*Primary Examiner*—Paul Loomis
*Attorney, Agent, or Firm*—John P. Veschi

[57] ABSTRACT

According to one aspect of the invention, two lines are utilized to selectively forward calls based on caller ID data. Thus, according to one embodiment of the invention, a method of connecting a calling party to a called party includes the steps of a customer premise equipment (CPE) receiving an incoming call from the calling party on a first line, the CPE evaluating caller ID data associated with the incoming call, and the CPE placing an outgoing call to the called party on a second line based on the caller ID data. In another embodiment, a CPE includes a first line, a second line, and a calling unit adapted to place an outgoing call on the second line based on caller ID data associated with an incoming call received on the first line. In yet another embodiment, a method of forwarding a call includes the steps of receiving the call on a first line, selectively calling a forwarding number on a second line based on caller ID data associated with the received call, and coupling the first line to the second line.

25 Claims, 1 Drawing Sheet

CALL FORWARDING VIA A 2-LINE PHONE

Priority of U.S. Provisional Application Serial No. 60/064417 filed Nov. 6, 1997, is hereby claimed.

CROSS-REFERENCE TO RELATED APPLICATIONS

This application is related to copending U.S. Patent Application No. entitled "Call Forwarding Via Three-Way Calling," (Cannon 1-2-4) co-filed herewith and incorporated herein by reference.

FIELD OF THE INVENTION

This invention is related to call forwarding, and in particular to a method and apparatus to enable call forwarding from a 2-line phone.

BACKGROUND OF THE INVENTION

Call forwarding is an optional service provided by some telephone service providers which, for a fee, enables a telephone subscriber to arrange for incoming calls to be forwarded to a forwarding number. In a typical scenario, the telephone subscriber will enable the call forwarding service through a keypad on the telephone subscriber's telephone (also known as "customer premise equipment" (CPE)). This enablement will cause the telephone service provider to readdress calls originally destined for the telephone subscriber's telephone to instead be addressed to a telephone specified by the telephone subscriber. For example, if a user of this service is about to leave the user's home to travel to the user's office, the user can engage the service by pressing a predetermined code on a keypad of the user's home telephone. In response to the signal created by this keypad activation, the telephone service provider may prompt the user to enter a forwarding number. Subsequently, the telephone service provider, through a central switch network (also known as "central office"), will cause telephone calls to the user's home telephone number to instead be connected to the user's work telephone number.

Many years ago, a "toll fraud" practice was employed. According to this practice, telephone calls were forwarded through an intermediary location in order to avoid charges for a long distance telephone call by instead having two local telephone calls. Similarly, calls were sometimes forwarded through an intermediate location to make it more difficult for the calls to be traced to the originator.

From the perspective of the user, conventional call forwarding as described above is inefficient and costly. For example, conventional call forwarding can only be initiated or terminated from the user's telephone. Thus, for example, if the user forgets to "set" call forwarding before leaving home, the user's calls will not be forwarded. Further, if the user changes location while away from the user's phone, conventional call forwarding does not allow the user to "reset" the call forwarding feature to forward calls to a different forwarding number. Also, conventional call forwarding does not allow for discrimination between incoming calls to forward individual calls to different destinations based on call related information such as caller ID data. Finally, conventional call forwarding is expensive, requiring the user to pay a monthly and/or per call premium.

SUMMARY OF THE INVENTION

According to one aspect of the invention, two lines are utilized to selectively forward calls based on caller ID data. Thus, according to one embodiment of the invention, a method of connecting a calling party to a called party includes the steps of a customer premise equipment (CPE) receiving an incoming call from the calling party on a first line, the CPE evaluating caller ID data associated with the incoming call, and the CPE placing an outgoing call to the called party on a second line based on the caller ID data. In another embodiment, a CPE includes a first line, a second line, and a calling unit adapted to place an outgoing call on the second line based on caller ID data associated with an incoming call received on the first line. In yet another embodiment, a method of forwarding a call includes the steps of receiving the call on a first line, selectively calling a forwarding number on a second line based on caller ID data associated with the received call, and coupling the first line to the second line.

DETAILED DESCRIPTION

Telephones with multiple lines, such as 2-line phones, are becoming more common. Whereas multiple line phones in the past were typically found in an office environment, they are increasingly being used in a home environment. As multimedia applications increase, the number of lines provided to a typical home and the number of lines available for use by a telephone will likely continue to increase. The present invention is an improvement to a conventional 2-line phone, through which the 2-line phone supports call forwarding functionality. By providing the call forwarding functionality in the telephone, the invention allows for increased user-controlled flexibility. Further, since the functionality is transparent to the central office, the user's cost is reduced when compared to conventional call forwarding features.

Figure 1:
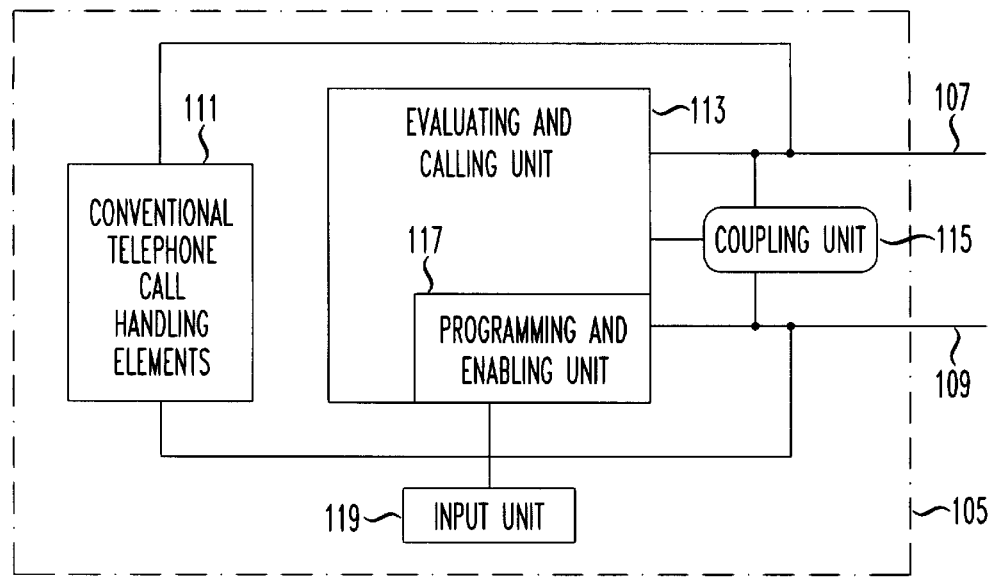
FIG. 1 is a simplified block diagram of a customer premise equipment according to the invention.

FIG. 1 is a simplified block diagram of a 2-line phone according to the invention. Telephone 105 is coupled to a first line 107 and to a second line 109. Although referred to herein as "lines", it is understood that one or both of first line 107 and second line 109 may be wireless, as opposed to wired, connections to the central switch network. It is further understood that these lines could be digital lines, such as ISDN lines, and these lines may also be realized as two virtual lines within the same physical line. First line 107 and second line 109 are coupled to conventional telephone call handling elements 111 for placing and receiving telephone calls in a conventional manner. In addition, first line 107 and second line 109 are coupled to evaluating and calling unit 113, and are also coupled to coupling unit 115. According to the invention, evaluating and calling unit 1 13 places an outgoing call on second line 109 in response to an incoming call received on first line 107. For example, in one embodiment, evaluating and calling unit 113 evaluates caller ID data associated with the incoming call received on first line 107, and places the outgoing call on second line 109 based on this evaluation. Coupling unit 115 selectively couples first line 107 to second line 109. This coupling can be based, for example, on an indication provided to coupling unit 115 by evaluating and calling unit 113 to inform coupling unit 115 that the outgoing call on second line 109 has been initiated.

Evaluating and calling unit 113 and coupling unit 115 may be realized as part of a processor, such as an integrated circuit digital signal processor (DSP). Such a DSP may also include a portion or all of the conventional telephone call handling elements 111. Thus, in one embodiment according to the invention, a DSP configured to support conventional telephone call handling functions is further configured to provide for call forwarding according to the invention. The configuration of evaluating and calling unit 113 and coupling unit 115 with the conventional telephone call handling elements 111 into a single processor is purely by way of example and not of limitation. Other configurations are also possible. For example, the conventional telephone call handling elements 111 can be incorporated into one processor, such as a single chip integrated circuit DSP, and the evaluating and calling unit 113 and coupling unit 115 can be incorporated into another processor. Further, although the conventional telephone call handling elements 111 are shown incorporated into telephone 105, it is understood that some of these elements, such as telephone answering machine elements, may be physically incorporated into a separate package coupled to telephone 105.

According to another embodiment, the evaluating and calling unit 113 is coupled to or integrated with a programming and enabling unit 117. The programming and enabling unit 117 provides a vehicle for a user to change programming of the evaluating and calling unit. For this purpose, programming and enabling unit 117 may be coupled to an input unit 119. Programming and enabling unit 117 may alternatively or additionally be coupled to one of the lines, such as second line 109.

Input unit 119 may take the form of a computer connected to telephone 105 through an input/output port, or through some other connection, such as an optical, magnetic, acoustic or metallic connection. In its simplest form, however, input unit 119 may take the form of a keypad that is incorporated into telephone 105 and that can be configured to be in a programming mode. For example, a user can press a predetermined sequence of keys on the keypad to enter the programming mode. Alternatively, a specific key can be provided for entering and exiting the programming mode. Via the input unit, a user programs the evaluating and calling unit by, for example, entering a forwarding number to which incoming calls are to be forwarded and by entering a command to set the call forwarding feature.

In an exemplary embodiment, the programming available via input unit 119 and programming and enabling unit 117 may also include the entry of specific call related information for use by evaluating and calling unit 113 to determine whether an incoming call is to be forwarded. For example, a user can program evaluating and calling unit 113 to only forward certain telephone calls based on an analysis of call related information, such as caller ID data, associated with the incoming calls. Calls that do not meet the forwarding criteria, according to this example, are handled in a conventional manner by conventional telephone call handling elements 111. Thus, for example, a user can program evaluating and calling unit 113 to forward calls received from a particular telephone number, and to have all other calls handled by exemplary answering machine elements of the conventional telephone call handling elements 111.

The programming available via input unit 119 and programming and enabling unit 117 may also include the opportunity to provide different forwarding numbers for different incoming callers based on call related information, such as caller ID data. Thus, for example, a user can program evaluating and calling unit 113 so that calls received from a first incoming caller are forwarded to a first forwarding number, and calls received from a second incoming caller are forwarded to a second forwarding number. The use of two separate incoming callers and two correspondingly separate forwarding numbers is purely by way of example and not of limitation. In practice, any number of forwarding numbers may be supported, and a user can establish any number of incoming callers for which forwarding is enabled to any of the forwarding numbers.

The above examples are based on a default situation wherein no forwarding occurs such that the user enables forwarding for specifically known incoming callers based, for example, on an analysis of caller ID data associated with incoming calls. Alternatively, the default condition may be that all calls are forwarded except for calls having specific call related information. For example, a user may program the evaluating and calling unit to evaluate caller ID data associated with incoming calls, and to forward all calls except those having specific caller ID data.

Programming and enabling unit 117 may also be coupled to a line, such as second line 109, to allow for remote programming according to the invention. According to this feature, a user can change the programming of evaluating and calling unit 113 while at a location separate from the location of telephone 105. For example, a user can call telephone 105 from a different location and program evaluating and calling unit 113 by activating predetermined key sequences on the user's distant phone. This programming activity may be facilitated by a prompting sequence provided by programming and enabling unit 117 according to a predetermined script.

Thus, for example, a user calling telephone 105 at the telephone number corresponding to second line 109 can alert the programming and enabling unit 117 to the user's intent to reprogram evaluating and calling unit 113 by pressing a predetermined key sequence on the user's distant telephone to cause a predetermined dual tone multi-frequency (DTMF) signaling sequence to be received by programming and enabling unit 117. In response, programming and enabling unit 117 can output a prompt on second line 109 to query the user. The user may respond to the query by activating appropriate keys on the user's distant telephone to provide corresponding DTMF signals to programming and enabling unit 117 in order to program the evaluating and calling unit 113.

Presume, for example, that telephone 105 is the user's home telephone, and the user initially programmed telephone 105 so that all calls received on first line 107 (the user's home telephone number) will be forwarded to the user's work telephone number. If the user is at the user's work location and departs the user's work location to go to a secondary location, such as a satellite office, the user can reprogram the evaluating and calling unit 113 to instead forward calls to the satellite office.

According to one embodiment, the user can configure telephone 105 so that first line 107 corresponds to the user's published telephone number and is therefore the "public" line, whereas second line 109 is primarily for (i) receiving overflow calls when first line 107 is busy, (ii) placing outgoing calls when calls to first line 107 are to be forwarded, and (iii) receiving programming calls from the user. According to such a configuration, when an incoming call is received on second line 109 (other than overflow calls from first line 107), programming and enabling unit 117 can presume the incoming call is a programming call from the user and cause the incoming call to be answered with a prompt according to a programming script.

Alternatively, the numbers associated with both first line 107 and second line 109 can be public, with calls to each line being independently forwarded on the other line according to the invention. For example, calls received on first line 107 can be forwarded via second line 109 (presuming second line 109 is free) to a first forwarding number, while calls received on second line 109 can be forwarded via first line 107 (presuming first line 107 is free) to a second forwarding number. The first and second forwarding numbers can, of course, be programmed.

A difficulty of this configuration is that, unlike the earlier described configuration, one of the two lines is not restricted in a way that the only calls it receives are programming calls. Thus, a mechanism is needed to allow reprogramming of the forwarding number without the reprogramming call being forwarded to the forwarding number. This functionality can be provided, for example, by having programming and enabling unit 117 issue a phantom ring, special ring or other indication to an incoming caller, and providing the incoming caller some time to indicate that the incoming caller wishes to reprogram the forwarding function. Programming and enabling unit 117 can then wait for either the reprogramming indication or the lapse of a predetermined period of time. If the predetermined period of time lapses, the incoming call will be forwarded according to the presently programmed forwarding instructions. If, on the other hand, the reprogramming indication is received, the incoming caller (presumably the user) will be able to reprogram the forwarding function by, for example, responding to scripted prompts issued by the programming and enabling unit.

The reprogramming indication can be, for example, a personal identification number entered by the user at the distant end phone and converted to DTMF tones interpretable by the programming and enabling unit 117. Alternatively, the reprogramming indication can be an audible signal, such as a spoken word, provided by the user into the distant end phone. Programming and enabling unit 117 may include spectral analysis or other voice recognition functionality to recognize the user's voice and enable reprogramming based on this analysis.

In an alternative embodiment, the evaluating and calling unit 113 may further be programmed to determine if a call placed to a forwarding number is busy, prior to alerting the coupling unit 115. In this way, coupling unit 115 will not couple an incoming call to a busy phone line. In this scenario, the incoming call will then be handled by the conventional telephone call handling elements 111.

In a related alternative embodiment, if the forwarding number is busy, evaluating and calling unit 113 may place a second forwarding call to a secondary forwarding number and alert coupling unit 115 to couple the phone lines so that the incoming call is forwarded to the secondary forwarding number. For this purpose, evaluating and calling unit 113 may include a memory for storing primary and secondary forwarding numbers. Such a memory can of course be programmed via the programming and enabling unit 117. Further, such a memory is not limited to primary and secondary forwarding numbers, but may also include tertiary forwarding numbers and further forwarding numbers for use in forwarding the incoming call based, for example, on calls to all of the higher ranking forwarding numbers being busy.

Figure 2:
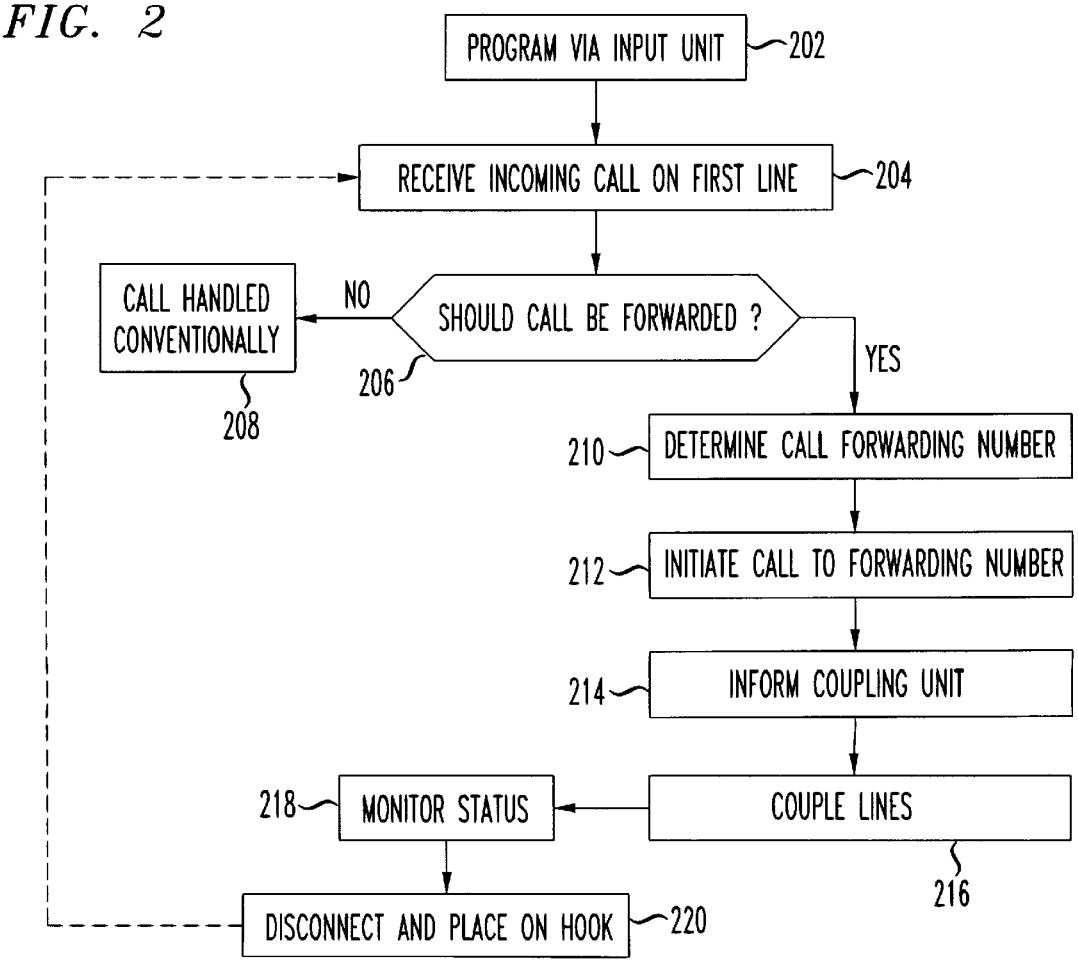
FIG. 2 is a flowchart showing an exemplary method of operation for the customer premise equipment shown in FIG. 1.

FIG. 2 provides a flowchart showing an example of operation of telephone 105 according to an exemplary scenario. At step 202 a user programs evaluating and calling unit 113 via programming and enabling unit 117 by activating input unit 119 by, for example, pressing specific keys on a keypad of telephone 105. An example of this programming is for the user to set evaluating and calling unit 113 to forward incoming calls to the user's work telephone number. The work telephone number can be set by entering the work telephone number into the keypad, or preferably can be set by selecting the work telephone number from a set of preprogrammed telephone numbers. This step of programming may be facilitated by a prompting script run by the processor or DSP within which programming and enabling unit 117 is realized. The script can query the user, for example, visually via a display on telephone 105, or audibly through a speaker on telephone 105.

At step 204, an incoming call to the telephone number corresponding to first line 107 is received by evaluating and calling unit 113. At step 206, evaluating and calling unit 113 evaluates call related information, such as caller ID data, associated with the incoming call and determines whether the call should be forwarded. Caller ID data is typically located between the first and second rings of the incoming call. The determination at step 206 can be based, for example, on a comparison of the caller ID data received with the incoming call to a table of previously programmed telephone numbers or incoming caller identities for which call forwarding is either enabled or disabled.

If the evaluating and calling unit 113 determines at step 206 that the call should not be forwarded, then at step 208 the incoming call is handled by conventional telephone call handling elements 111 in a conventional manner. For example, an answering machine unit incorporated into or coupled to telephone 105 can process the incoming call by prompting the incoming caller to leave a message for the called party. Conventional telephone answering devices typically process an incoming call after a predetermined number of rings, such as four rings. Thus, according to this example, the call related information is received between the first and second rings, this information is then evaluated at step 206, and, based on the determination that the call should not be forwarded, the answering machine unit of the conventional telephone call handling elements 111 begins to process the incoming call after the fourth ring at step 208.

If, on the other hand, the evaluating and calling unit 113 determines at step 206 that the call should be forwarded, at step 210 the evaluating and calling unit 113 determines the forwarding number. According to this exemplary scenario, step 210 includes determining the user's work telephone number set by the user at step 202. In a more detailed example, step 210 can include a selection of the forwarding number from a plurality of potential forwarding numbers based on call related information such as caller ID data associated with the incoming call.

At step 212, the evaluating and calling unit 113 initiates a call to the forwarding number (the user's work number in this scenario) via second line 109. At step 214 the evaluating and calling unit 113 informs coupling unit 115 that the forwarding call has been initiated. At step 216 the coupling unit 115 connects first line 107 to second line 109 to complete the call forwarding process. The call to the user's home phone number is thus forwarded to the user's work phone number and can be received by the user. The user, at the user's work location, can be conscious of the fact that the incoming call was originally destined for the user's home telephone by noting that call related information such as caller ID data associated with the incoming call corresponds to second line 109 of the user's home telephone.

At step 218, coupling unit 115 monitors the call status on first line 107 and second line 109, and at step 220 the coupling unit 115 disconnects the first line 107 from the second line 109 and places both first line 107 and second line 109 in an on-hook status based on a determination that the call is complete.

If, after receiving the incoming call, the user plans to leave the user's work location, the user can remotely control the call forwarding feature of telephone 105 by calling the telephone number corresponding to second line 109 to engage programming and enabling unit 117. For example, if the user intends to return home, the user can simply disable the call forwarding function so that for a future incoming call on first line 107 the determination at step 206 is that the call should not be forwarded. This will result in the call being handled conventionally, such as being handled by an answering machine unit in conventional telephone call handling elements 111. If, on the other hand, the user intends to leave the user's work location to go to a satellite office, the user can change the forwarding number to that of the user's satellite office. This will result, for a future incoming call on first line 107, in a decision at step 206 to forward the call, a determination at step 210 of the telephone number of the satellite office, an initiation of a call at step 212 to the satellite office and further processing according to steps 214-220.

What is claimed is:

1. A customer premise equipment (CPE), comprising:
   a first line;
   a second line;
   a calling unit adapted to selectively place an outgoing call on the second line based on Caller ID data associated with an incoming call received on the first line;
   a coupling unit adapted to couple the first line to the second line; and
   an enabling unit adapted to selectively enable the calling unit,
   wherein the enabling unit is adapted to be remotely controlled by a user, such that the user can remotely change a status of the enabling unit.

2. A CPE as recited in claim 1, wherein the coupling unit is further adapted to monitor a call status on the first line and the second line, and to place the first line and the second line in an on-hook status when the call status indicates call completion.

3. A customer premise equipment (CPE), comprising:
   a first line;
   a second line;
   a calling unit adapted to selectively place an outgoing call on the second line based on Caller ID data associated with an incoming call received on the first line;
   a coupling unit adapted to couple the first line to the second line; and
   an enabling unit adapted to selectively enable the calling unit,
   wherein the enabling unit and the calling unit are adapted to be remotely controlled by a user, such that the user can remotely change a status of the enabling unit, and can remotely program the calling unit to operate based on particular Caller ID data.

4. A multiline telephone comprising:
   a first line configured to receive incoming calls; and
   a second line configured to place outgoing calls based on the incoming calls, and to receive programming calls by which a user provides instructions relating to the outgoing calls.

5. A multiline telephone as recited in claim 4, wherein the instructions are programming instructions regarding a telephone number for an outgoing call.

6. A multiline telephone as recited in claim 5, wherein the instructions include Caller ID data of particular incoming calls to be forwarded as part of the outgoing calls.

7. A multiline telephone as recited in claim 4, wherein the outgoing calls on the second line are forwarded calls of incoming calls on the first line.

8. A multiline telephone, comprising:
   a first line;
   a second line;
   a coupling unit adapted to couple an outgoing call to a particular number on one of the first line and the second line with an incoming call on the other of the first line and the second line; and
   a programming unit adapted to enable a user to provide programming information associated with the particular number as part of an incoming call.

9. A multiline telephone as recited in claim 8, wherein the programming unit is adapted to distinguish between an incoming call that should be forwarded and an incoming call that is for programming purposes.

10. A multiple line telephone as recited in claim 9, wherein the programming unit distinguishes based on Caller ID data.

11. A multiline telephone as recited in claim 9, wherein the programming unit distinguishes based on the line associated with the incoming call.

12. A multiline telephone as recited in claim 9, wherein the programming unit is adapted to cause a delay, prior to the coupling unit coupling the first line and the second line, wherein the programming unit monitors the incoming line for information indicating a programming call.

13. A multiline telephone as recited in claim 12, wherein the information is DTMF information.

14. A multiline telephone as recited in claim 12, wherein the information is a spoken word.

15. A multiline telephone as recited in claim 12, wherein the programming unit provides the incoming caller with an indication regarding a programming period associated with the delay.

16. A multiline telephone as recited in claim 15, wherein the indication is a special ring.

17. A multiline telephone as recited in claim 16, wherein the indication is a phantom ring.

18. A method of handling an incoming call on a line of a multiline telephone comprising the steps of:
   determining if the incoming call is a programming call;
   enabling programming of a forwarding number for at least some incoming calls if the incoming call is a programming call; and
   forwarding the incoming call to a predetermined forwarding number on another line of the multiline telephone if the incoming call is not a programming call.

19. A method of handling an incoming call as recited in claim 18, wherein the determining step is based on a line associated with the incoming call.

20. A method of handling an incoming call as recited in claim 18, wherein the determining step is based on Caller ID data associated with the incoming call.

21. A method of handling an incoming call as recited in claim 18, wherein the determining step comprises:

entering a programming phase associated with a predetermined delay period; and sensing for the entry of a particular input during the programming phase.

22. A method as recited in claim 21, further comprising the step of providing an incoming caller with an indication related to the programming phase.

23. A method as recited in claim 22, wherein the indication is a special ring.

24. A method as recited in claim 22, wherein the indication is a phantom ring.

25. A method as recited in claim 21, further comprising the step of determining a completion of the programming phase, wherein the forwarding step is completed based on the determining layer.

* * * * *